US010253184B2

(12) United States Patent
Lee

(10) Patent No.: US 10,253,184 B2
(45) Date of Patent: Apr. 9, 2019

(54) POLYAMIDE COMPOSITION COMPRISING AMORPHOUS POLYAMIDE AND/OR POLYESTER WITH ENHANCED AND UNIFORM ELECTRICAL CONDUCTIVITY

(71) Applicant: RHODIA OPERATIONS, Paris (FR)

(72) Inventor: Kwang-Sang Lee, Seoul (KR)

(73) Assignee: RHODIA OPERATIONS, Paris (FR)

( * ) Notice: Subject to any disclaimer, the term of this patent is extended or adjusted under 35 U.S.C. 154(b) by 150 days.

(21) Appl. No.: 15/310,589

(22) PCT Filed: May 11, 2015

(86) PCT No.: PCT/EP2015/060271
§ 371 (c)(1),
(2) Date: Nov. 11, 2016

(87) PCT Pub. No.: WO2015/173156
PCT Pub. Date: Nov. 19, 2015

(65) Prior Publication Data
US 2017/0081514 A1    Mar. 23, 2017

(30) Foreign Application Priority Data
May 12, 2014  (EP) .................................... 14167824

(51) Int. Cl.
| H01B 1/24 | (2006.01) |
| C08L 77/06 | (2006.01) |
| C08K 7/06 | (2006.01) |
| C08K 7/14 | (2006.01) |
| C08L 67/02 | (2006.01) |
| C08K 3/04 | (2006.01) |

(52) U.S. Cl.
CPC ................ C08L 77/06 (2013.01); C08K 7/06 (2013.01); C08K 7/14 (2013.01); C08L 67/02 (2013.01); H01B 1/24 (2013.01); C08K 3/04 (2013.01); C08K 3/041 (2017.05); C08L 2203/20 (2013.01); C08L 2205/025 (2013.01); C08L 2205/03 (2013.01)

(58) Field of Classification Search
CPC ...... C08L 77/06; C08L 77/00; C08L 2203/20; C08L 2205/03; C08L 2205/025; C08K 7/06; C08K 7/14; C08K 3/04; C08K 3/041; H01B 1/24

USPC ................................ 252/610, 511, 500, 510
See application file for complete search history.

(56) References Cited

U.S. PATENT DOCUMENTS

| 8,686,086 B2 * | 4/2014 | Abad ........................ C08J 3/20 |
| | | 523/351 |
| 9,428,612 B2 * | 8/2016 | Rulkens ................ C08G 69/02 |
| 2002/0173584 A1 | 11/2002 | Ebert et al. |
| 2005/0070657 A1 | 3/2005 | Elkovitch et al. |
| 2008/0073620 A1 | 3/2008 | Taniguchi et al. |
| 2008/0167415 A1 | 10/2008 | Stoeppelmann et al. |
| 2010/0080978 A1 * | 4/2010 | Jerome ................. C08J 9/0066 |
| | | 428/317.9 |
| 2011/0023986 A1 * | 2/2011 | Hoffmann ............... C08L 77/02 |
| | | 138/118 |
| 2011/0027512 A1 | 2/2011 | Lee et al. |
| 2011/0294910 A1 * | 12/2011 | Kriha ...................... C08J 9/232 |
| | | 521/59 |
| 2012/0108701 A1 | 5/2012 | Lim et al. |
| 2013/0200308 A1 * | 8/2013 | Lee ......................... H01M 2/08 |
| | | 252/500 |
| 2014/0066561 A1 | 3/2014 | Pfleghar et al. |
| 2014/0127440 A1 * | 5/2014 | Norfolk ............... C08G 69/265 |
| | | 428/36.92 |

FOREIGN PATENT DOCUMENTS

| EP | 0984330 A1 | 3/2000 |
| EP | 1245640 A1 | 10/2002 |
| EP | 1942147 A1 | 7/2008 |
| EP | 2471866 A1 | 7/2012 |
| EP | 2610313 A1 | 7/2013 |
| EP | 2703436 A1 | 3/2014 |

OTHER PUBLICATIONS

Man Wu et al.: "Electrical and mechanical behaviors of carbon nanotube-filled polymer bllends" Journal of Applied Polymer Science, vol. 99, No. 2, Jan. 15, 2006 (Jan. 15, 2006), pp. 477-488, XP055150790, ISSN: 0021-8995, DOI: 10.1002/app.22255 Composition CNT-filled PET / nylon 6,6 throughout the documents; p. 478, col. 2.

* cited by examiner

Primary Examiner — Douglas J McGinty
(74) Attorney, Agent, or Firm — Osha Liang LLP

(57) ABSTRACT

Provided is a composition comprising a) at least one semi-crystalline polyamide, b) at least one conductive material, and c) at least one amorphous polyamide, and optionally d) at least one polyester. The composition may further comprise e) at least one filler and f) at least one additive.

19 Claims, 1 Drawing Sheet

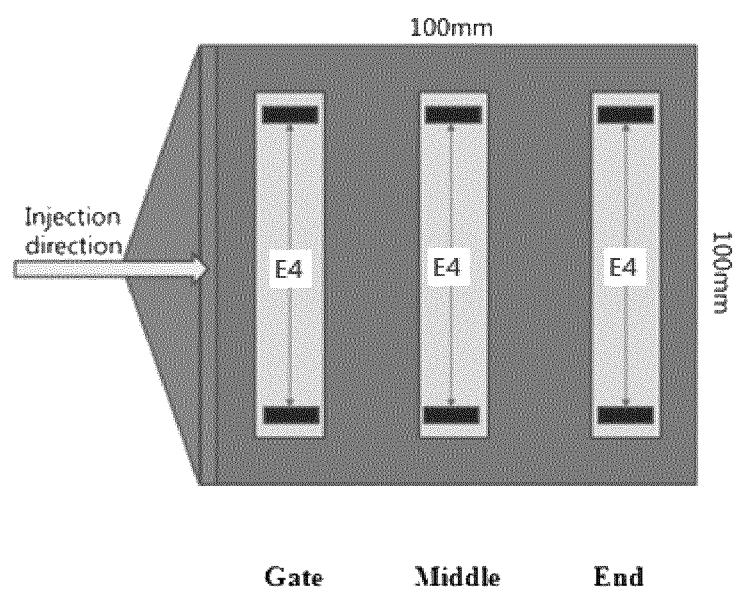

POLYAMIDE COMPOSITION COMPRISING AMORPHOUS POLYAMIDE AND/OR POLYESTER WITH ENHANCED AND UNIFORM ELECTRICAL CONDUCTIVITY

CROSS-REFERENCE TO RELATED APPLICATION

The present application is a U.S. national stage entry under 35 U.S.C. § 371 of International Application No. PCT/EP2015/060271 filed May 11, 2015 which claims priority to European patent application No. 14167824.3, filed on May 12, 2014, the whole content of these applications being hereby incorporated herein by reference. Should the disclosure of any patents, patent applications, and publications which are incorporated herein by reference conflict with the description of the present application to the extent that it may render a term unclear, the present description shall take precedence.

FIELD OF THE INVENTION

The present invention relates to a composition comprising at least one semi-crystalline polyamide, at least one conductive material, and at least one amorphous polyamide, and optionally at least one polyester, to molded parts obtainable therefrom, and to use thereof. The present invention also relates to use of at least one amorphous polyamide and/or at least one polyester to enhance electrical conductivity and to obtain a uniform distribution of electrical conductivity of a polyamide composition. The composition according to the present invention can be advantageously used to produce housings or housing parts in various applications, including motor vehicles, industrial machines, home electronic appliances, preferably a fuel filter housing for all diesel engines in an automobile application and a housing for an engine control unit in an electric vehicle application.

BACKGROUND OF THE INVENTION

A polyamide is one of the polymers which are frequently used as engineering plastics for a very wide range of applications.

A polyamide composition is of significant commercial interest and may be used to produce housings or housing parts in various applications, including motor vehicles, industrial machines, home electronic appliances, for example, a fuel filter housing for a diesel engine, generally by injection molding.

In 1994, the European Union (EU) adopted the ATEX Directive 94/9/EC, which establishes technical and legal requirements for products intended for use inside hazardous areas with potentially explosive atmospheres. ATEX derives its name from the French title of the 94/9/EC Directive, i.e., Appareils destinés aêtre utilisés en Atmosphères Explosibles. As of July 2003, it is mandatory to use products which have an ATEX type approval within EU. Any product placed on the market or put into use in hazardous environments regulated by the ATEX Directive is required to meet the standards stipulated therein. The standards vary depending on the classification of the hazardous areas.

One of the standards for equipments in hazardous areas requires that polymer housings containing electrical equipment be electrically conductive. The main concern of the Directive is a potential build-up of static charges within the polymer housing. If sufficient static charges are built up, then there exists a potential for spark, which in a gaseous or dusty environment presents a significant risk of explosion or fire.

In order to provide stability against fire or explosion due to such a build-up of static charges, which may occur during fuel filtering in diesel engines, electrical conductivity is required and thus attempts have been made to increase electrical conductivity of a polymer composition intended to be used to produce a fuel filter housing by incorporating electrically conductive materials such as carbon fibers or carbon black into the polymer composition.

However, a polymer composition comprising such conductive materials generally shows uneven distribution of electrical surface conductivity by injection molding according to injection pressure and speed, and the electrical surface conductivity changes according to the distance from gate in an injection mold. That is to say, the electrical surface conductivity decreases as such distance increases.

In order to obtain a uniform distribution of electrical conductivity, therefore, more conductive materials are to be added and therefore a problem of overdesign may occur.

Accordingly, a polymer composition, which can accomplish a rather uniform distribution of electrical conductivity with less addition of conductive materials while still exhibiting excellent electrical conductivity, is required in this technology field.

BRIEF DESCRIPTION OF THE DRAWING

FIG. 1 provides a plan view of an injection molding device in accordance with one or more embodiments of the present invention. The electrical surface conductivity (E4) is indicated as being constantat three positions along the injection direction of the injection molding device.

DESCRIPTION OF THE INVENTION

The object of the present invention is therefore to provide a polyamide composition having a uniform distribution of electrical conductivity while maintaining excellent electrical conductivity even with less amount of conductive materials.

The present invention relates to a composition comprising a) at least one semi-crystalline polyamide, b) at least one conductive material, and c) at least one amorphous polyamide, and optionally d) at least one polyester.

Indeed, it has been surprisingly found by the present inventors that less amount of conductive materials are required to attain a certain level of electrical conductivity of a polyamide composition, when used with amorphous polyamide, compared to the case using conductive materials only without said amorphous polyamide.

One of the essential features of the present invention is that a uniform distribution of electrical surface conductivity is accomplished with conductive materials, such as carbon fibers, when used with amorphous polyamide, wherein the amount of conductive materials, such as carbon fibers, required to obtain an even distribution of electrical conductivity within a polyamide composition is reduced, and thus there is no risk of overdesign of a relevant product obtainable from the polyamide composition.

In the present invention, the term "polyamide" is intended to denote, in particular, a polyamide comprising recurring units complying with any of formula (I) or formula (II) [recurring units ($R_{PA}$)]:

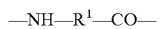  formula (I):

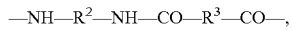  formula (II):

wherein:
- R¹, equal to or different from each other at each occurrence, is a divalent hydrocarbon group having from 1 to 17 carbon atoms;
- R², equal to or different from each other at each occurrence, is a divalent hydrocarbon group having from 1 to 18 carbon atoms; and
- R³, equal to or different from each other at each occurrence, is a divalent hydrocarbon group having from 1 to 16 carbon atoms.

The polyamide of the inventive composition is preferably an aliphatic polyamide, that is to say that R¹, R² and R³ are aliphatic groups.

Recurring units ($R_{PA}$) of the polyamide can be notably obtained through polycondensation reaction of (1) one of β-lactam, 5-amino-pentanoic acid, ε-caprolactam, 9-aminononanoic acid, 10-aminodecanoic acid, 11-aminoundecanoic acid, 12-aminododecanoic acid and/or polycondensation reaction of (2) at least one of oxalic acid (HOOC—COOH), malonic acid (HOOC—CH₂—COOH), succinic acid [HOOC—(CH₂)₂—COOH], glutaric acid [HOOC—(CH₂)₃—COOH], adipic acid [HOOC—(CH₂)₄—COOH], 2,4,4-trimethyl-adipic acid [HOOC—CH(CH₃)—CH₂—C(CH₃)₂—CH₂—COOH], pimelic acid [HOOC—(CH₂)₅—COOH], suberic acid [HOOC—(CH₂)₆—COOH], azelaic acid [HOOC—(CH₂)₇—COOH], sebacic acid [HOOC—(CH₂)₈—COOH], undecanedioic acid [HOOC—(CH₂)₉—COOH], dodecandioic acid [HOOC—(CH₂)₁₀—COOH], tetradecandioic acid [HOOC—(CH₂)₁₂—COOH], octadecandioic acid [HOOC—(CH₂)₁₆—COOH] with at least one of diamines, such as 1,4-diamino-1,1-dimethylbutane, 1,4-diamino-l-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-l-butylethane, 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane, and 1,12-diaminododecane.

Exemplary recurring units ($R_{PA}$) of the polyamide are notably:
- (i) —NH—(CH₂)₅—CO—, i.e. recurring units which can be notably obtained via polycondensation reaction of ε-caprolactam;
- (ii) —NH—(CH₂)₈—CO—, i.e. recurring units which can be notably obtained via polycondensation reaction of 9-aminononanoic acid;
- (iii) —NH—(CH₂)₉—CO—, i.e. recurring units which can be notably obtained via polycondensation reaction of 10-aminodecanoic acid;
- (iv) —NH—(CH₂)₁₀—CO—, i.e. recurring units which can be notably obtained via polycondensation reaction of 11-aminoundecanoic acid;
- (v) —NH—(CH₂)₁₁—CO—, i.e. recurring units which can be notably obtained via polycondensation reaction of laurolactam;
- (vi) —NH—(CH₂)₆—NH—CO—(CH₂)₄—CO—, i.e. recurring units which can be notably obtained via polycondensation reaction of hexamethylene diamine and adipic acid;
- (vii) —NH—(CH₂)₆—NH—CO—(CH₂)₈—CO—, i.e. recurring units which can be notably obtained via polycondensation reaction of hexamethylene diamine and sebacic acid;
- (viii) —NH—(CH₂)₆—NH—CO—(CH₂)₁₀—CO—, i.e. recurring units which can be notably obtained via polycondensation reaction of hexamethylene diamine and dodecanoic acid;
- (ix) —NH—(CH₂)₁₀—NH—CO—(CH₂)₁₀—CO—, i.e. recurring units which can be notably obtained via polycondensation reaction of decamethylene diamine and dodecanoic acid;
- (x) —NH—(CH₂)₆—NH—CO—(CH₂)₇—CO—, i.e. recurring units which can be notably obtained via polycondensation reaction of hexamethylene diamine and azelaic acid (otherwise known as nonandioic acid);
- (xi) —NH—(CH₂)₁₂—NH—CO—(CH₂)₁₀—CO—, i.e. recurring units which can be notably obtained via polycondensation reaction of dodecamethylene diamine and dodecanoic acid;
- (xii) —NH—(CH₂)₁₀—NH—CO—(CH₂)₈—CO—, i.e. recurring units which can be notably obtained via polycondensation reaction of decamethylene diamine and decanoic acid;
- (k) —NH—(CH₂)₄—NH—CO—(CH₂)₄—CO—, i.e. recurring units which can be notably obtained via polycondensation reaction of 1,4-butanediamine and adipic acid; and
- (kk) —NH—(CH₂)₄—NH—CO—(CH₂)₈—CO—, i.e. recurring units which can be notably obtained via polycondensation reaction of 1,4-butanediamine and sebacic acid.

Preferably, the polyamide consists essentially of recurring units ($R_{PA}$), as above detailed, being understood that end-chain, defects and other irregularities can be present in the polyamide chain, without affecting the properties thereof.

Recurring units ($R_{PA}$) of the polyamide can be all of the same type, or can be of more than one type, that is to say that the polyamide (PA) can be a homo-polyamide or a co-polyamide.

In the present invention, the term "semi-crystalline polyamide" is intended to denote, in particular, a polyamide comprising a crystallizable portion and an amorphous portion in the skeleton, i.e., an amorphous polymeric material contains randomly entangled chains and a crystalline material contains domains in which the polymer chains are packed in an ordered array, where these crystalline domains are embedded in an amorphous polymer matrix. The semi-crystalline polyamide of the present invention has a melting point greater than 150° C. and a heat of fusion greater than 5 J/g. The melting point may be measured by any known method, for example, differential scanning calorimeter (DSC).

Specific examples of the aliphatic polyamides which can be advantageously used in the hereby provided composition are notably:
polyamide 6, polyamide 6,6, and mixtures and co-polyamides thereof.

Particularly preferred aliphatic polyamide to be used in the composition of the present invention is polyamide 6,6.

In the present invention, an amount of a) at least one semi-crystalline polyamide is from 15.0 wt % to 92.0 wt % with respect to the total weight of the composition. Preferably, the amount of at least one semi-crystalline polyamide is from 40.0 wt % to 70.0 wt %, more preferably 48.0 wt % to 65.5 wt % with respect to the total weight of the composition.

In the present invention, the term "conductive material" is intended to denote, in particular, a compound imparting electrical conductivity to a polyamide composition of the present invention.

Examples of the conductive material in the present invention comprise, but are not limited to, carbon black, carbon fibers, carbon nanotubes (CNT), graphite, and the like.

In one embodiment of the present invention, the conductive materials are carbon fibers.

In the present invention, an amount of b) at least one conductive material is from 3.0 wt % to 40.0 wt % with respect to the total weight of the composition. Preferably, the amount of at least one conductive material is from 6.0 wt % to 20.0 wt %, more preferably 8.0 wt % to 15.0 wt % with respect to the total weight of the composition.

In the present invention, the term "amorphous polyamide" is intended to denote, in particular, a polyamide, which has a heat of fusion of less than 5 J/g, preferably 0 J/g, i.e., no detectable melting point, and exhibits superior transparency and good barrier properties to gases such as $O_2$ and $CO_2$, water, solvents, etc. The amorphous polyamide retards the rate of crystallization and thus results in a superior surface appearance. Examples of the amorphous polyamide suitable for being used in the present invention comprise, but are not limited to, polyamide 6I/6T, polyamide 6I/10T, bis-4-(amino-3-methyl-cyclohexyl)-methane (3,3'-diemthyl-4,4'-diaminodicyclohexylmethane) (MACM), and mixtures and co-polyamides thereof, preferably polyamide 6I/6T. Polyamide 6I/6T, which may be prepared by copolymerization of 1,6-hexamethylene diamine, isophthalic acid and terephthalic acid, is most advantageously used in the composition of the present invention. Selar® polyamide 6I/6T may be mentioned as a suitable commercial amorphous polyamide, which can be used in the composition of the present invention.

In the present invention, an amount of c) at least one amorphous polyamide is from 2.5 to 15.0 wt % with respect to the total weight of the composition. Preferably, the amount of at least one amorphous polyamide is from 3.0 to 12.0 wt %, more preferably from 4.0 wt % to 10.0 wt % with respect to the total weight of the composition.

The composition according to the present invention may optionally comprise d) at least one polyester.

In the present invention, the term "polyester" is intended to denote, in particular, a type of polymers which contain ester functional groups in their main chain. Examples of the polyester may comprise a homopolymer or copolymer obtainable by condensation of a dicarboxylic acid or its derivatives with a diol or its derivatives, or mixtures thereof.

Examples of dicarboxylic acids may comprise, but are not limited to, aromatic dicarboxylic acids such as terephthalic acid, isophthalic acid, phthalic acid, 1,4-, 1,5-, 2,6- or 2,7-naphthalene dicarboxylic acid, bis(p-carboxyphenyl) methane, anthracene dicarboxylic acid, diphenyl ether 4,4'-dicarboxylic acid, sodium 5-sulfoisophthalic acid, etc.; aliphatic dicarboxylic acids such as adipic acid, sebacic acid, azelaic acid, dodecanedioic acid, etc.; cycloaliphatic dicarboxylic acids such as 1,3-cyclohexane dicarboxylic acid, 1,4-cyclohexane dicarboxylic acid, etc.; and derivatives thereof. In a certain embodiment, said derivatives may be substituted by alkyl, alkoxy or halogen group.

In addition, examples of diols may comprise, but are not limited to, aliphatic glycol having 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, cyclohexanediol, etc.; glycol with long chain having molecular weight of 400 to 6000 such as polyethylene glycol, poly-1,3-propylene glycol, polytetramethylene glycol, etc.; and derivatives thereof. In a certain embodiment, said derivatives may be substituted by alkyl, alkoxy or halogen group.

Examples of the polyester suitable for being used in the composition of the present invention comprise, but are not limited to, polybutylene terephthalate (PBT), polybutylene terephthalate/isophthalate copolymer, polybutylene terephthalate/adipate copolymer, polybutylene terephthalate/sebacate copolymer, polybutylene terephthalate/decanedicarboxylate copolymer, polybutylene naphthalate, polyethylene terephthalate (PET), polyethylene terephthalate/isophthalate copolymer, polyethylene terephthalate/adipate copolymer, polyethylene terephthalate/sodium 5-sulfoisophthalate copolymer, polybutylene terephthalate/sodium 5-sulfoisophthalate copolymer, polypropylene terephthalate, polyethylene naphthalate, polycyclohexanedimethylene terephthalate, and the like. PBT may be prepared through polycondensation of terephthalic acid with 1,4-butanediol, and PET through polycondensation of terephthalic acid with ethylene glycol, etc.

In addition to the above-mentioned polyesters, examples of the polyester suitable for being used in the composition of the present invention comprise, but are not limited to, polyesters copolymerized with a copolymerizable monomer, for example, hydroxycarboxylic acid such as glycolic acid, hydroxybezoic acid, hydroxyphenylacetic acid, naphthylglycolic acid, etc.; and lactones such as propiolactone, butyrolactone, caprolactone, valerolactone, etc.

In one embodiment of the present invention, the polyester is PET.

In the present invention, an amount of d) at least one polyester may be from 0 to 30.0 wt %, preferably from 0 to 20.0 wt %, more preferably from 0 to 10 wt % with respect to the total weight of the composition. When d) at least one polyester is present in the composition, its amount will be generally comprised between 2.5 and 30.0 wt %, preferably between 3.0 and 20.0 wt %, more preferably between 4.0 wt % and 10.0 wt % with respect to the total weight of the composition.

The composition according to the present invention may optionally comprise e) at least one filler.

In the present invention, the term "filler" is intended to denote, in particular, a material added to a polymer composition to improve its properties and/or to reduce the cost. By appropriately selecting these materials, not only the economics but also other properties such as processing and mechanical behavior can be improved. Although these fillers retain their inherent characteristics, very significant differences are often seen depending on the molecular weight, compounding technique and the presence of other additives in the formulation. Therefore, once the basic property requirements are established, the optimum type and the loading level of the filler for the balance between cost and performance must be determined.

In the present invention, the filler is preferably selected from the group consisting of glass fibres, glass beads, calcium carbonate, silicates, talc, kaolin, mica, wood powders, and powders and fibres of other natural products, and synthetic fibres. Glass fibres are most advantageously used in the composition of the present invention.

In the present invention, an amount of e) at least one filler may be from 0 to 30.0 wt %, preferably from 0 wt % to 25.0 wt %, more preferably from 0 wt % to 20.0 wt % with respect to the total weight of the composition. When at least one filler is present in the composition, its amount will be generally comprised between 5.0 and 30.0 wt %, preferably between 10.0 and 25.0 wt %, more preferably between 18.0 and 20.0 wt % with respect to the total weight of the composition.

In addition, the composition according to the present invention may optionally comprise f) at least one additive. Examples of the additives, which may be advantageously used, comprise, but are not limited to, a colorant, a lubricant, a light stabiliser, a heat stabiliser, a flame retardant, a plasticizer, a nucleating agent, a surfactant, an antioxidant, an antistatic agent, a pigment, and the like.

In the present invention, an amount of f) at least one additive may be from 0 to 3.0 wt %, preferably 0 to 2.5 wt %, more preferably 0 to 2.0 wt % with respect to the total weight of the composition. The range of concentration by weight of the additive, if contained in the composition of the present invention, may be from 0.2 to 2.0 wt %, preferably from 0.5 to 2.0 wt % with respect to the total weight of the composition.

In a preferred embodiment of the present invention, the composition comprises:
a) at least one semi-crystalline polyamide 48.0 to 65.5 wt %;
b) at least one conductive material 8.0 to 10.0 wt %;
c) at least one amorphous polyamide 4.0 to 10.0 wt %;
d) at least one polyester 4.0 to 10.0 wt %;
e) at least one filler 18.0 to 20.0 wt %; and
f) at least one additive 0.5 to 2.0 wt %,
wherein the total amount of a)-f) is 100 wt % of the composition.

In another preferred embodiment of the present invention, the composition comprises:
a) at least one semi-crystalline polyamide 53.0 to 69.0 wt %;
b) at least one conductive material 8.0 to 12.0 wt %;
c) at least one amorphous polyamide 4.5 to 13.0 wt %;
e) at least one filler 18.0 to 20.0 wt %; and
f) at least one additive 0.5 to 2.0 wt %,
wherein the total amount of a), b), c), e), and f) is 100 wt % of the composition.

Another aspect of the present invention relates to a use of c) at least one amorphous polyamide and/or d) at least one polyester to enhance electrical conductivity and to obtain uniform distribution of electrical conductivity of a polymer composition; notably a polymer composition comprising a) a semi-crystalline polyamide, more preferably a polymer composition comprising a) a semi-crystalline polyamide and b) a conductive material.

Another aspect of the present invention relates to molded parts produced by injection molding of the present composition.

Further aspect of the present invention relates to a use of the molded parts to produce housings or housing parts in various applications, including motor vehicles, industrial machines, home electronic appliances, preferably a fuel filter housing for all diesel engines in an automobile application and a housing for an engine control unit in an electric vehicle application.

The composition according to the invention may be used as a raw material, for example, for the preparation of articles by injection molding, by injection/blow molding, by extrusion or by extrusion/blow molding, preferably by injection molding. According to an embodiment, the polyamide composition is extruded in the form of rods, for example, in a twin-screw extruder, and then chopped into granules. The molded parts are then prepared by melting said granules and feeding the molten composition into injection molding devices.

Other details or advantages of the present invention will become more clearly apparent through the examples given below. The present invention will be elucidated by the following examples, which are intended to demonstrate, but not to restrict the invention.

EXAMPLES

The compositions used are as follows:
Comparative Examples 1, 2, and 3 (hereinafter, Ex. 1 Comp., Ex. 2 Comp., and Ex. 3 Comp.) : mixtures of polyamide 6,6, carbon fibers, PET, olefin copolymer grafted with maleic anhydride, high density polyethylene (HDPE), glass fibers, and additives.

Examples 1 and 2 (hereinafter, Ex. 1 and 2) : mixtures of polyamide 6,6, carbon fibers, amorphous polyamide, glass fibers, PET, and additives.

Chemical reagents used in the Examples are specified as follows :
Polyamide 6,6: STABAMID® 26AE1 K PA66 is a semi-crystalline polyamide 6,6 available from Solvay Polyamide & Intermediates;
Carbon fibers : XS12 available from Toray Industries Inc.;
Glass fibers: 289H available from Nippon Electric Glass Co. Ltd. (NEG);
Amorphous polyamide : polyamide 6I/6T, commercially available under trade name Selar® PA3426 from E.I. DuPont;
PET : A9066 available from Woongjin Chemical Co., Ltd.;
Olefin copolymer grafted with maleic anhydride : Fusabond® 493D available from E. I. DuPont; and
HDPE : LH6070 available from Daelim Korea.

The compositions prepared are detailed in Table 1 below. The proportions are indicated in weight percentages in the composition.

TABLE 1

| Component (in wt %) | Ex. 1 Comp. | Ex. 1 | Ex. 2 | Ex. 2 Comp. | Ex. 3 Comp. |
|---|---|---|---|---|---|
| Polyamide 6,6 | 69.0 | 59.0 | 59.0 | 59.0 | 59.0 |
| Carbon fibers | 10.0 | 10.0 | 10.0 | 10.0 | 10.0 |
| Amorphous Polyamide | — | 10.0 | 5.0 | — | — |
| PET | — | — | 5.0 | 10.0 | — |
| Glass fibers | 20.0 | 20.0 | 20.0 | 20.0 | 20.0 |
| Fusabond ® 493D | — | — | — | — | 5.0 |
| LH6070 | — | — | — | — | 5.0 |
| Additives | 1.0 | 1.0 | 1.0 | 1.0 | 1.0 |
| Total | 100.0 | 100.0 | 100.0 | 100.0 | 100.0 |

Comparative Examples

Heating polyamide 6,6 was carried out at a temperature of greater than or equal to its melting point to produce a molten polyamide 6,6.

A composition of Ex. 1 Comp. was obtained by mixing said molten polyamide 6,6, and additives together into hopper in a ZSK 82 Mc[18] twin-screw extruder from Coperion, while feeding glass fibers and carbon fibers through side-feeding zone of the extruder by using each side feeder.

Compositions of Ex. 2 Comp. and Ex. 3 Comp. were obtained by mixing a molten polyamide 6,6 likewise produced, PET, olefin copolymer, HDPE, and additives together into hopper in the same extruder as used in Ex. 1 Comp., while feeding glass fibers and carbon fibers through side-feeding zone of the extruder by using each side feeder.

The extrusion temperatures were 280 280 280 280 280 280 280 280 280 270-260° C. from nozzle to hopper, and the throughput and screw speed were 25 kg/hr and 300 RPM, respectively.

The extrudates were then cooled in water at room temperature and chopped into granules. The electrical surface conductivity was measured as being $2*10^{5-9}$ $\Omega/\square$ (Ohms per square), which falls within the dissipative range, which allows the charges to flow to ground more slowly in a more controlled manner than with conductive materials, using Surface Resistance Meter SRM-100 (Bondine, UK).

Examples (Ex. 1 and Ex. 2)

A molten polyamide 6,6 matrix was likewise produced. Compositions of Ex. 1 and 2 were obtained by mixing said molten polyamide 6,6, amorphous polyamide, PET, and additives together into hopper in the same extruder as used in Ex. 1 Comp., while feeding glass fibers and carbon fibers through side-feeding zone of the extruder by using each side feeder. The extrusion conditions were the same with those for Ex. 1 Comp.

The extrudates were likewise cooled in water at room temperature and chopped into granules. The electrical surface conductivity was measured as being $2*10^{4-5}$ $\Omega/\square$, which falls within the conductive range, which has a low electrical resistance, and thus electrons flow easily across the surface or through these materials.

The electrical surface conductivity of the composition obtained from the Comparative Examples and Examples, respectively, are summarized in Table 2 below. Subsequently, the granules obtained as above were molten and fed into the injection molding device (LG 80E) so as to verify the distribution of electrical surface conductivity by position, i.e., depending on the distance from the gate of the injection molding device. The cylinder temperatures of the injection molding device were 280-280-280-260-240° C. from nozzle to hopper. The electrical surface conductivity was measured at three positions along the injection direction using the same SRM-100 meter.

TABLE 2

|  | Ex. 1 Comp. | Ex. 1 | Ex. 2 | Ex. 2 Comp. | Ex. 3 Comp. |
|---|---|---|---|---|---|
| Electrical surface Conductivity ($\Omega/\square$) [near gate] | $2*10^9$ | $2*10^4$ | $2*10^5$ | $2*10^6$ | $2*10^7$ |
| Electrical surface Conductivity ($\Omega/\square$) [in the middle] | $2*10^8$ | $2*10^4$ | $2*10^4$ | $2*10^5$ | $2*10^7$ |
| Electrical surface Conductivity ($\Omega/\square$) [at the end] | $2*10^5$ | $2*10^4$ | $2*10^4$ | $2*10^5$ | $2*10^6$ |

The electrical surface conductivity for Comparative Examples was $2*10^{6-9}$ $\Omega/\square$ near the gate, $2*10^{5-8}$ $\Omega/\square$ in the middle, and $2*10^{5-6}$ $\Omega/\square$ at the end of the injection molding device, whereas the electrical surface conductivity for Examples was $2*10^{4-5}$ $\Omega/\square$ at three positions along the injection direction, respectively. A graph, which shows constant electrical surface conductivity (E4 represents $2*10^4$ $\Omega/\square$) for Ex. 1 as a function of distance from the injection molding device, is provided as FIG. 1.

As being confirmed from all the above experimental data, the electrical conductivity of Examples was noticeably increased compared to that of Comparative Examples. It was also verified that the distribution of electrical surface conductivity of Examples was much more uniform regardless of the distance from the injection molding device compared to that of Comparative Examples, of which the electrical surface conductivity showed changes according to such distance.

The invention claimed is:

1. A composition comprising a) at least one semi-crystalline polyamide, b) at least one conductive material, and c) at least one amorphous polyamide and, optionally d) at least one polyester, wherein the semi-crystalline polyamide is selected from the group consisting of polyamide 6, polyamide 6,6, polyamide 6,10, polyamide 11, polyamide 12, polyamide 6,12, and mixtures and co-polyamides thereof.

2. The composition according to claim 1, wherein the conductive material is selected from the group consisting of carbon black, carbon fibers, carbon nanotubes, graphite, and any combinations thereof.

3. The composition according to claim 1, wherein the amorphous polyamide is selected from the group consisting of polyamide 6I/6T, polyamide 6I/10T, bis-4-(amino-3-methyl-cyclohexyl)-methane (3,3'-dimethyl-4,4'-diaminodicyclohexylmethane), and mixtures and co-polyamides thereof.

4. The composition according to claim 1, wherein the polyester is selected from the group consisting of polybutylene terephthalate, polyethylene terephthalate, polybutylene adipate, polyethylene succinate, polybutylene succinate, polyethylene sebacate, polybutylene sebacate and any combinations thereof.

5. The composition according to claim 1, further comprising e) at least one filler selected from the group consisting of glass fibres, glass beads, calcium carbonate, silicates, talc, kaolin, mica, wood powders, and powders and fibres of other natural products and synthetic fibres.

6. The composition according to claim 1, further comprising f) at least one additive selected from the group consisting of a colorant, a lubricant, a light stabiliser, a heat stabiliser, a flame retardant, a plasticizer, a nucleating agent, a surfactant, an antioxidant, an antistatic agent, a pigment, and any combination thereof.

7. The composition according to claim 1, wherein the composition comprises from 15.0 to 92.0 wt %, with respect to the total weight of the composition, of the at least one semi-crystalline polyamide.

8. The composition according to claim 1, wherein the composition comprises from 3.0 to 40.0 wt %, with respect to the total weight of the composition, of the at least one conductive material.

9. The composition according to claim 1, wherein the composition comprises from 2.5 to 15.0 wt %, with respect to the total weight of the composition, of the at least one amorphous polyamide.

10. The composition according to claim 1, wherein the composition comprises from 2.5 to 30.0 wt %, with respect to the total weight of the composition, of the at least one polyester.

11. A method for improving the properties of a polymer composition, comprising adding at least one amorphous polyamide and optionally at least one polyester to the polymer composition to enhance electrical conductivity and to obtain a uniform distribution of electrical conductivity of the polymer composition, wherein the polymer composition comprises: a) at least one semi-crystalline polyamide, and b) at least one conductive material, and wherein the semi-crystalline polyamide is selected from the group consisting of polyamide 6, polyamide 6,6, polyamide 6,10, polyamide 11, polyamide 12, polyamide 6,12, and mixtures and co-polyamides thereof.

12. An article produced by injection molding of the composition according to claim 1.

13. A diesel fuel filter housing for an automobile application comprising an article according to claim 12.

14. An article for a motor vehicle application, comprising an article according to claim 12.

15. The composition according to claim 1, wherein the semi-crystalline polyamide comprises polyamide 6,6.

16. The composition according to claim 2, wherein the conductive material comprises carbon fibers.

17. The composition according to claim 3, wherein the amorphous polyamide comprises polyamide 6I/6T.

18. The composition according to claim 4, wherein the polyester comprises polyethylene terephthalate.

19. The composition according to claim 5, wherein the filler comprises glass fibres.

* * * * *